(12) United States Patent
Lemmens

(10) Patent No.: US 7,252,181 B2
(45) Date of Patent: Aug. 7, 2007

(54) AIR PRESSURE PROPORTIONAL DAMPER

(75) Inventor: Luc Lemmens, Genk (BE)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 0 days.

(21) Appl. No.: 10/738,341

(22) Filed: Dec. 17, 2003

(65) Prior Publication Data

US 2005/0133978 A1 Jun. 23, 2005

(51) Int. Cl.
*B60G 11/27* (2006.01)
(52) U.S. Cl. ............................... 188/322.13; 280/5.503
(58) Field of Classification Search ... 188/315–322.22; 267/64.16–64.28; 280/5.503
See application file for complete search history.

(56) References Cited

U.S. PATENT DOCUMENTS

| | | | |
|---|---|---|---|
| 3,148,871 A * | 9/1964 | Wilkins et al. .......... 267/64.17 |
| 4,785,920 A | 11/1988 | Knecht et al. |
| 4,880,086 A | 11/1989 | Knecht et al. |
| 4,964,492 A | 10/1990 | Joseph |
| 5,159,554 A * | 10/1992 | Buma et al. .................. 701/37 |
| 5,180,039 A | 1/1993 | Axthammer et al. |
| 5,282,645 A | 2/1994 | Spakowski et al. |
| 5,301,776 A | 4/1994 | Beck |
| 5,392,885 A * | 2/1995 | Patzenhauer et al. .... 188/282.1 |
| 5,398,789 A | 3/1995 | Handke |
| 5,431,259 A * | 7/1995 | Mizutani et al. ......... 188/266.4 |
| 5,503,258 A | 4/1996 | Clarke et al. |
| 5,533,596 A * | 7/1996 | Patzenhauer et al. .... 188/266.6 |
| 5,725,239 A * | 3/1998 | de Molina ............... 280/5.503 |
| 6,305,512 B1 * | 10/2001 | Heinz et al. ............. 188/299.1 |
| 6,412,759 B1 * | 7/2002 | Krauss .................... 267/64.23 |
| 6,428,024 B1 * | 8/2002 | Heyring et al. ....... 280/124.106 |
| 6,725,983 B2 * | 4/2004 | Bell .......................... 188/269 |

* cited by examiner

*Primary Examiner*—Christopher P. Schwartz
(74) *Attorney, Agent, or Firm*—Harness, Dickey & Pierce, PLC

(57) ABSTRACT

A suspension system includes an air spring and a shock absorber disposed between the sprung and unsprung portions of a vehicle. A vehicle height sensor sends signals to a control system which adjusts the height of the vehicle by increasing or decreasing the air pressure within the spring. This same air pressure is provided to the shock absorber in order to increase the damping rate for high loads and decrease the damping rate for low loads. The air pressure to the shock absorber is provided to a valve assembly which controls fluid flow between the working chamber of the shock absorber and a reserve chamber.

19 Claims, 4 Drawing Sheets

AIR PRESSURE PROPORTIONAL DAMPER

FIELD OF THE INVENTION

The present invention relates to a hydraulic damper or shock absorber adapted for use in a suspension system such as the suspension systems used for automotive vehicles. More particular, the present invention relates to a hydraulic damper or shock absorber for use in a suspension system which incorporates pneumatic controls which select between a firm damping and a soft damping characteristic for the shock absorber based upon the loading of the vehicle.

BACKGROUND OF THE INVENTION

In recent years, substantial interest has grown in motor vehicles having suspension systems which can offer improved comfort and road handling for the vehicle. The improvements for these suspension systems can be achieved by utilization of an "intelligent" suspension system. An "intelligent" suspension is capable of controlling the suspension forces generated by the hydraulic dampers or shock absorbers provided at each corner of the motor vehicle in response to one or more operating characteristics of the vehicle.

In general, vehicle suspension systems are provided to filter or isolate the vehicle body from road surface irregularities as well as to control body and wheel motion. In addition, it may be desirable that the suspension system maintain an average vehicle attitude to promote improved vehicle stability during maneuvering. The conventional non-intelligent suspension system includes a spring and a damping device in parallel which is located between the sprung mass (vehicle body) and the unsprung mass (the wheel and suspension systems).

Hydraulic actuators, such as shock absorbers and/or struts, are used in conjunction with the conventional non-intelligent or passive suspension systems to absorb unwanted vibrations which occur during driving. To absorb these unwanted vibrations, the conventional hydraulic actuators often include a piston which is located within a pressure tube and which is connected to the body of the automobile through a piston rod. The pressure tube is connected to the vehicle's suspension system. Because the piston is able to limit the flow of damping fluid within the working chamber of the pressure tube when the actuator is telescopically displaced, the actuator is able to produce a damping force which counteracts the vibration which would otherwise be directly transmitted from the suspension system to the vehicle body. The greater the degree to which the flow of damping fluid within the working chamber is restricted by the piston, the greater the damping forces which are generated by the actuator.

In order to maintain a vehicle's attitude for multiple loading conditions, it is often desirable to have a leveling system associated with the vehicle. This vehicle leveling system can be associated with the hydraulic damper, it can be associated with the vehicle's springs, or it may be separate from both the hydraulic dampers and the springs. These leveling systems are used to change the relationship between the vehicle's suspension system and the vehicle body. The leveling systems are used to compensate for weight changes associated with the vehicle. The weight changes can be the result of changes in static loading or changes in dynamic loading. Static loading is simply the load which is supported by the suspension system which is due to the weight associated with the passengers of the vehicle, the weight of the cargo in the vehicle, and the like. In contrast, dynamic loading involves the loading which normally varies according to different types of road conditions.

When changing the height of the vehicle in response to the vehicle's weight, it is also desirable to adjust the damping characteristics of the vehicle's hydraulic dampers. A relatively low weighted vehicle typically requires a softer or lower damping characteristic than a relatively highly weighted vehicle. The continued development of suspension systems have been directed towards methods of adjusting the damping characteristics of the hydraulic dampers in response to the leveling system which reacts to the vehicle's weight.

SUMMARY OF THE INVENTION

The present invention is directed to a suspension system that is self-adjusting in response to the loading of the vehicle. The system incorporates pneumatic controls which act as a leveling system while simultaneously adjusting the damping characteristics of the vehicle's hydraulic damper or shock absorbers. The present invention includes a valve associated with each shock absorber which opens or closes a bypass passage between the working chamber of the shock absorber and the reserve chamber of the shock absorber. The opening and closing of the bypass passage by the valve is controlled by the air pressure being supplied to the leveling system for the vehicle.

Other advantages and objects of the present invention will become apparent to those skilled in the art from the subsequent detailed description, appended claims and drawings.

BRIEF DESCRIPTION OF THE DRAWINGS

In the drawings which illustrate the best mode presently contemplated for carrying out the present invention.

DETAILED DESCRIPTION OF THE PREFERRED EMBODIMENT

Figure 1:
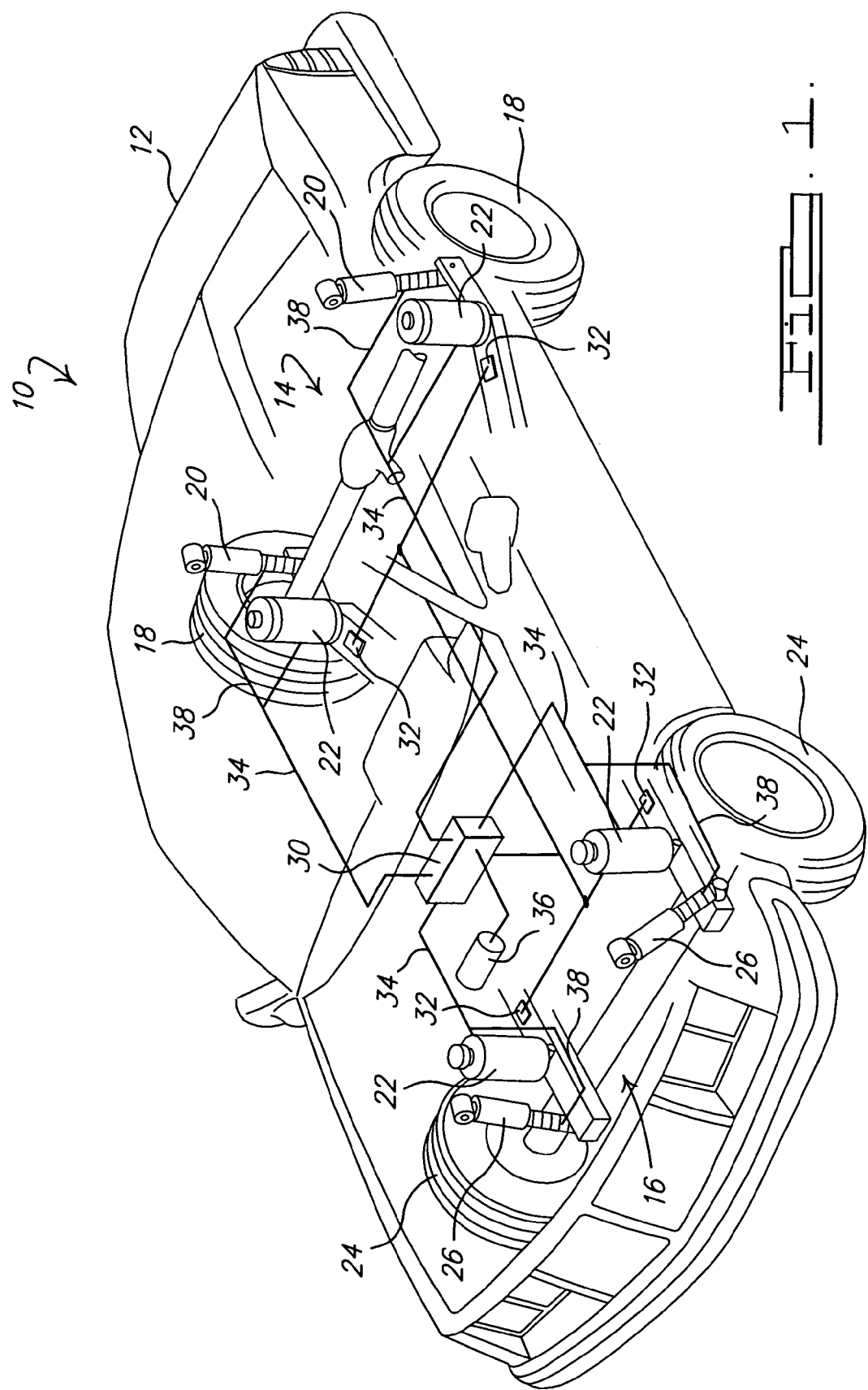
FIG. 1 is a schematic perspective of an automobile incorporating a load dependent suspension system which includes the air pressure proportional damping system in accordance with the present invention.

Referring now to the drawings in which like reference numerals designate like or corresponding parts throughout the several views, there is shown in FIG. 1 a vehicle incorporating a load dependant suspension system in accordance with the present invention which is indicated generally by the reference numeral 10. While the present invention is illustrated in the drawings as being associated with an automotive vehicle, it is within the scope of the present invention to incorporate the load dependant suspension system of the present invention in other types of vehicles. In addition, the term "shock absorber" as used herein refers to shock absorbers in the general sense of the phrase and includes MacPherson struts.

Figure 2:
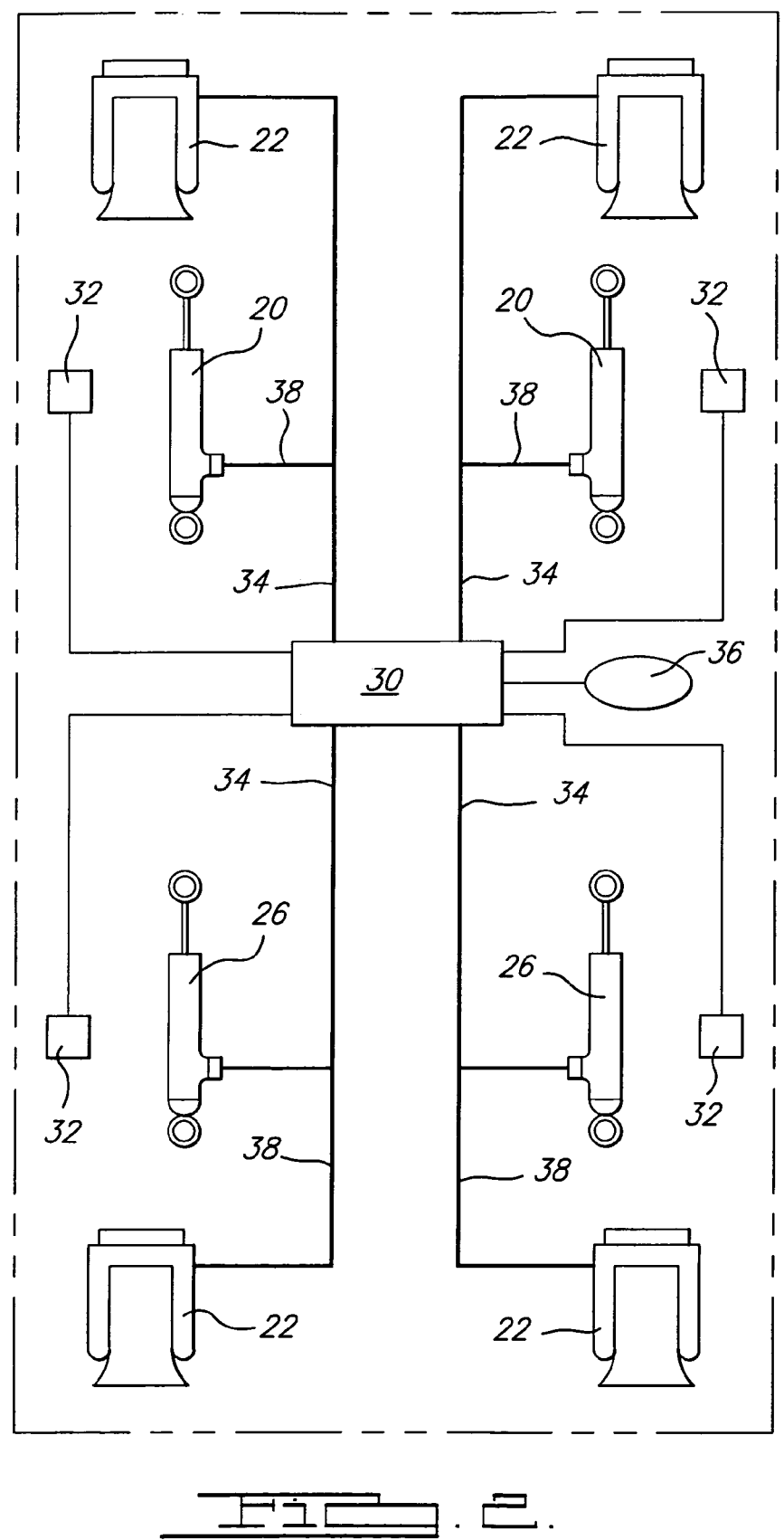
FIG. 2 is a schematic representation of the pneumatic control system for the load dependant suspension system in accordance with the present invention.

Referring now to FIGS. 1 and 2, vehicle 10 includes a body 12, a rear suspension assembly 14 and a front suspension assembly 16. Rear suspension assembly 14 includes a transversely extending rear axle assembly adapted to operatively support the vehicle's rear wheels 18. Rear suspension assembly 14 is operatively connected to body 12 by means of a pair of shock absorbers 20 as well as by a pair of air springs 22. Front suspension system 16 includes a transversely extending front axle assembly adapted to operatively support the vehicle's front wheels 24. Front suspension system 16 is operatively connected to body 12 by means of a pair of shock absorbers 26 and by another pair of air springs 22. Shock absorbers 20 and 26 serve to dampen the relative motion of the unsprung portion (front suspension assembly 16 and rear suspension assembly 14) and the sprung portion (body 12) of vehicle 10. It should be understood that reference is being made within this detailed description to the terms "air shock" and "air pressure proportional damper". It should be understood that the "air" referred to may be substituted with other gas or liquids without deviating from the present invention.

Referring to FIGS. 1 and 2, vehicle 10 includes a control system 30 which is in communication with a height sensor 32 located at each corner of vehicle 10. Each height sensor 32 monitors the height of body 12 in relation to suspension assemblies 14 and 16. Control system 30 also includes a pneumatic pressure line 34 connecting each air spring 22 with a compressor 36 controlled by control system 30. Each pressure line 34 includes a connecting pressure line 38 which connects each pressure line 34 with a respective shock absorber 20 or a respective shock absorber 26. When one or more of height sensors 32 indicates that the position of vehicle body 12 is lower than a specified amount, control system 30 activates compressor 36 to supply pressurized air to the air spring 22 adjacent to the specific height sensor 32. The pressurized air extends the individual air spring 22 to raise vehicle body 12 back to its specified height. Connecting line 38 supplies pressurized air to the adjacent shock absorber 20 or 26 to adjust the damping characteristics of the adjacent shock absorber 20 or 26 as will be detailed below. When one or more of height sensors 32 indicates that the position of vehicle body 12 is higher than a specific amount, control system 30 releases air pressure from the air spring 22 adjacent to the specific height sensor 32. The release of pressurized air lowers vehicle body 12 back to the specified height. Connecting line 38 releases pressurized air from the adjacent shock absorber 20 or 26 to adjust the damping characteristics of the adjacent shock absorber 20 or 26 as will be described below.

While control system 30 is shown controlling each shock absorber 20 and 26 individually, it is within the scope of the present invention to simultaneously control both shock absorbers 20 and to simultaneously control both shock absorbers 26. Also, it is within the scope of the present invention to simultaneously control all four shock absorbers 20 and 26 if desired.

Figure 3:
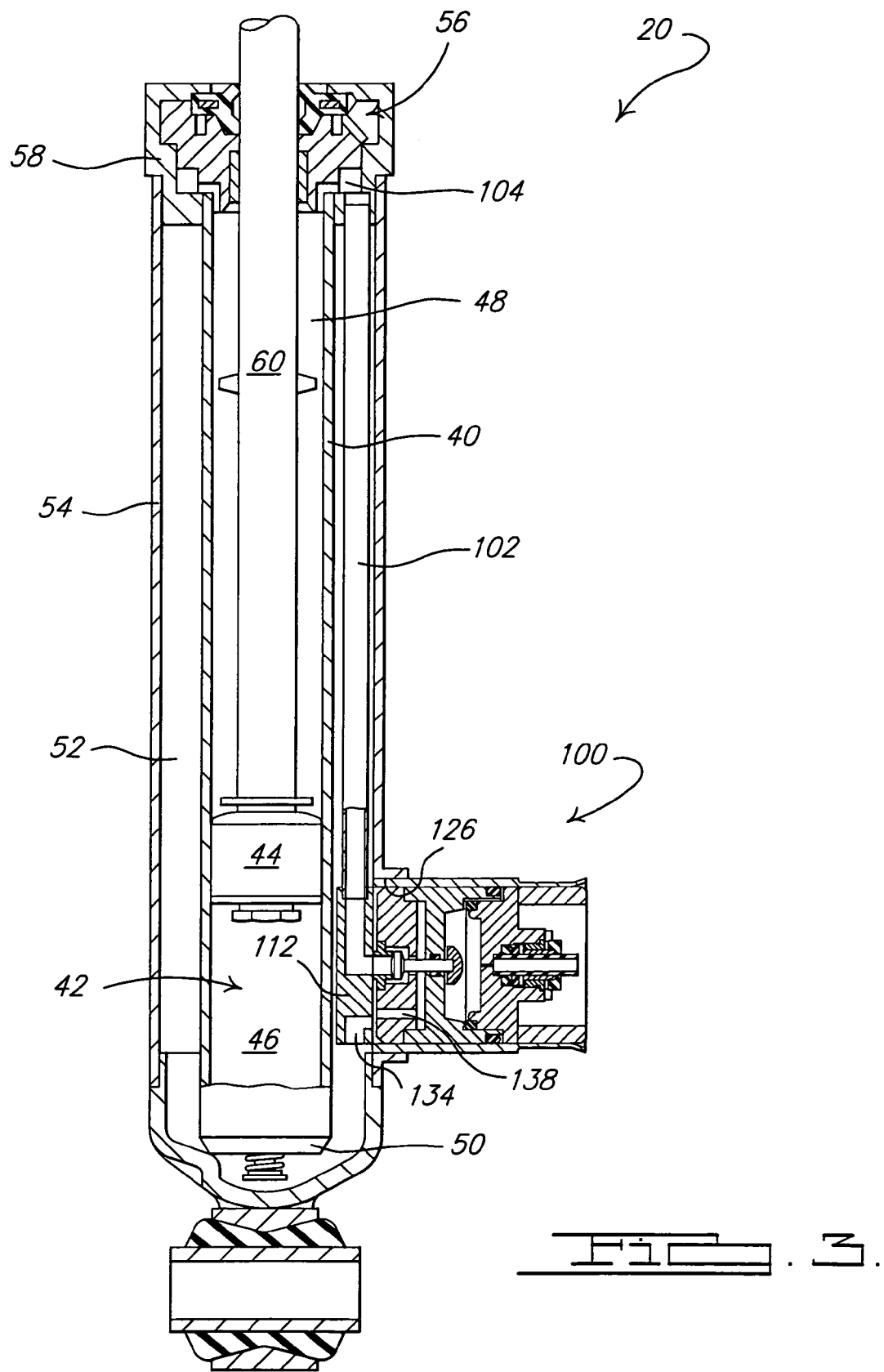
FIG. 3 is a vehicle cross-sectional view of the air pressure proportional damper in accordance of the present invention.
Figure 4:
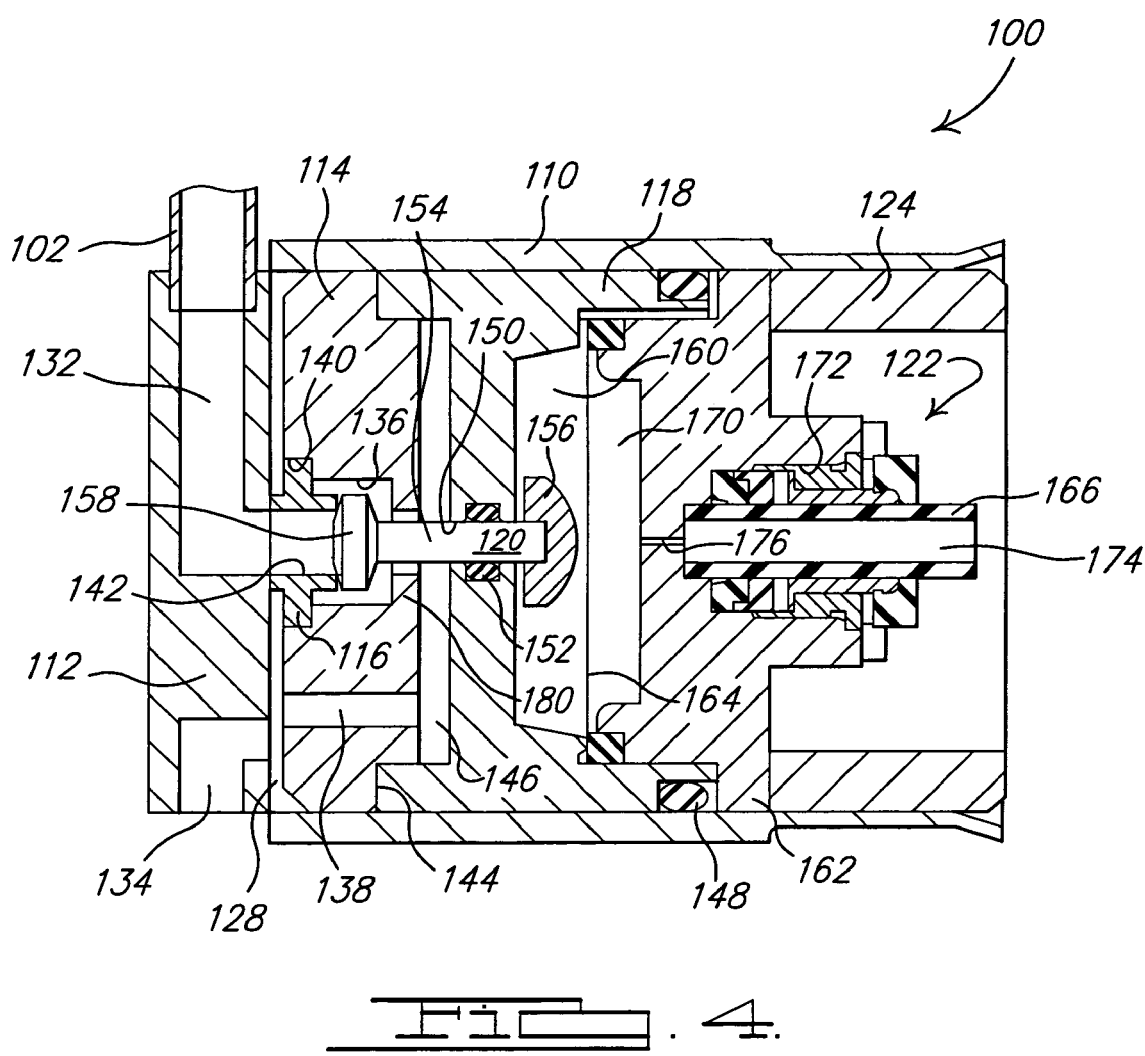
FIG. 4 is an enlarged cross-sectional view of the control valve for the air pressure proportional damper shown in FIG. 3.

Referring now to FIGS. 3 and 4, shock absorber 20 is shown in greater detail. While FIGS. 3 and 4 illustrate shock absorber 20, it is to be understood that shock absorber 26 also includes the air pressure proportional damping system in accordance with the present invention.

Shock absorber 20 is a dual tube shock absorber which comprises an elongated pressure cylinder 40 defining a damping fluid containing working chamber 42. A slidably movably piston assembly 44 divides chamber 42 into a lower working chamber 46 and an upper working chamber 48.

Shock absorber 20 further comprises a base valve 50 located within the lower end of pressure cylinder 40 which permits the flow of damping fluid between lower working chamber 46 and an annular reserve chamber 52 defined by a reserve tube 54.

Referring to the upper end of shock absorber 20, a rod guide and seal assembly 56 seats within an upper end cap 58 of pressure cylinder 40 and reserve tube 54. Rod guide and seal assembly 56 limits radial movement of an axially extending piston rod 60 and provides a fluid seal to prevent fluid from leaking from either upper working chamber 48 or from reserve chamber 52 during reciprocation of piston rod 60. Further, rod guide and seal assembly 56 seals shock absorber 20 from the introduction of dirt, dust or other contaminants into the fluidic portions of shock absorber 20.

A variable valve assembly 100 fluidly communicates with upper working chamber 48 through a fluid tube 102 and a fluid passage 104 extending through rod guide and seal assembly 56. Variable valve assembly 100 comprises a valve housing 110, an inner valve body 112, an upper valve body 114, a plunger seat 116, a plunger housing 118, a plunger assembly 120, a nipple housing assembly 122, and a closing ring 124. Valve housing 110 is a cup shaped housing which extends through an aperture 126 extending through reserve tube 54. Housing 110 defines an internal chamber 128 which is in communication with reserve chamber 52 through an aperture 130.

Inner valve body 112 is disposed within aperture 130 and it defines a fluid passage 132 within which is disposed fluid tube 102. For reasons of clarity, variable valve assembly 100 has been rotated 900 in FIG. 4. Fluid passage 132 is an L-shaped passage which receives fluid tube 102 through a radial portion and communicates with passage 142. Inner valve body 112 also defines an axial passage 134 disposed adjacent to passage 132. Passage 134 also provide communication between internal chamber 128 and reserve chamber 52.

Upper valve body 114 is a cylindrical shaped body which defines a central fluid passage 136 and an axially extending fluid passage 138. Plunger seat 116 is located within a recessed area 140 of upper valve body 114. Upper valve body 114 is disposed within the bottom area of internal chamber 128 and is positioned such that plunger seat 116 sealingly engages inner valve body 112 such that fluid passage 132 fluidically communicates with central fluid passage 136 through a passage 142 extending through plunger seat 116.

Plunger housing 118 is disposed within internal chamber 128 adjacent to upper valve body 114 and engages a recessed area 144 of upper valve body 114 to defines a fluid chamber 146. An O-ring 148 seals the interface between plunger housing 118 and valve housing 110. Plunger assembly 120 is slidingly disposed within an aperture 150 extending through plunger housing 118. An O-ring 152 seals the interface between plunger assembly 120 and plunger housing 118. Plunger assembly 120 comprises a plunger 154 and a plunger head 156. Plunger 154 has an enlarged end portion 158 which is disposed within passage 136 and which engages plunger seat 116 to control fluid flow through passage 142 of plunger seat 116. Thus, when enlarged end portion 158 of plunger 154 is spaced from plunger seat 116, fluid flow from upper working chamber 48 through passage 104, through tube 102, through passage 132, through passage 142 and passage 136 into chamber 146 is permitted. Fluid then flows from chamber 146 to reserve chamber 52 through passages 138 and 134. This places upper working chamber 48 in fluid communication with reserve chamber 52. When enlarged end portion 158 is urged against plunger seat 116, fluid flow through passage 142 is prohibited and upper working chamber 48 is not in open communication with reserve chamber 52. Plunger head 156 is secured to the end of plunger 154 opposite to enlarged end portion 158.

Nipple housing assembly 122 is disposed within internal chamber 128 adjacent to plunger housing 118 and with plunger housing 118 defines a first pressure chamber 160. Nipple housing assembly 122 comprises a nipple housing 162, a disc seal assembly 164 and a nipple assembly 166. Disc seal assembly 164 is sealingly attached to nipple housing 162 and with nipple housing 162 it defines a second pressure chamber 170. Nipple assembly 166 is sealingly disposed within an aperture 172 defined by nipple housing 162. Nipple assembly 166 defines a fluid passage 174 which is in communication with second pressure chamber 170 through a control orifice 176.

Thus, when connecting line 38 is sealingly attached to nipple assembly 166, the pressurized fluid within the adjacent air spring 22 is in communication with second pressure chamber 170. The pressurized fluid within second pressurized chamber 170 deflects disc seal assembly 164 to urge it against plunger head 156 and urge end portion 158 of plunger 154 against plunger seat 116. The amount of pressure within air spring 22 will determine the load urging end portion 158 against plunger seat 116 and this will in turn determine the fluid pressure within upper working chamber 48 required to unseat end portion 158 from plunger seat 116 and allow fluid flow between upper working chamber 48 and reserve chamber 52.

When the vehicle is in an unladen or low loaded condition, the air pressure within one or more of air springs 22 is reduced by control system 30. The reduction of air pressure within air spring 22 simultaneously reduced the air pressure in a respective pressure line 38 and thus a respective second pressure chamber 170. The reduction of pressure within chamber 170 releases pressure exerted by disc seal assembly 164 against plunger head 156 of plunger 154. This allows end portion 158 of plunger 154 to move away from seat 116 easier to allow fluid flow between upper working chamber 48 and reserve chamber 52. On a rebound stroke of shock absorber 20, in an unladen condition, fluid within upper working chamber 48 is compressed causing fluid to flow through piston assembly 44 and eventually through valve assembly 100. This dual flow path for fluid within upper working chamber 48 provides a relatively soft or low damping force to be generated when the pressure within air spring 22 is relatively low.

When the vehicle is in a laden or highly loaded condition, the air pressure within one or more of air springs 22 is increased by control system 30. The increase of air pressure within air spring 22 simultaneously increases the air pressure in a respective pressure line 38 and thus a respective second pressure chamber 170. The increase of pressure within chamber 170 increases pressure exerted by disc seal assembly 164 against plunger head 156 of plunger 154. This, in turn, urges end portion 158 of plunger 154 against seat 116 to restrict fluid flow between upper working chamber 48 and reserve chamber 52. On a rebound stroke of shock absorber 20, in a laden condition, fluid within upper working chamber 48 is compressed causing fluid to flow through piston assembly 44. Fluid pressure will increase within upper working chamber 48 as well as within fluid passage 104 and fluid tube 102. This pressurized fluid will react against end portion 158 of plunger 154 and once the fluid pressure is sufficient to unseat end portion 158 from seat 116, fluid will then flow through valve assembly. The initial single flow path for fluid within upper working chamber 48 (only through piston assembly 44) provides a relatively firm or high damping force to be generated. The degree of damping will be controlled by the force being exerted by air pressure from spring 22 against plunger 154 which is biased against seat 116.

Shock absorber 20 and variable valve assembly also incorporate a fail safe function. When there is a problem with the air pressure supply, for instance if connection line 38 leaks, there will be little or no air pressure acting on disc seal assembly 164 and on plunger 154. Consequently, pressurized oil coming from passage 132 and 142 will encounter no resistance from plunger 154 and plunger 154 will be pushed against an upper plunger seat 180, formed by upper valve body 114. As a result, oil will not flow through passages 136 to fluid chamber 146 and the damping force created by shock absorber 20 will increase to a level that is higher or equal to the highly loaded situation or what is called its fail safe function.

While the above detailed description describes the preferred embodiment of the present invention, it should be understood that the present invention is susceptible to modification, variation and alteration without deviating from the scope and fair meaning of the subjoined claims.

What is claimed is:

1. A suspension damping system for use with a vehicle having a vehicle body and an unsprung portion, said damping system comprising:
    a spring interconnecting the unsprung portion and said vehicle body, said spring having a pressurized gas therein;
    means for determining a position of said vehicle body in relation to said unsprung portion;
    a shock absorber separate from said spring, said shock absorber interconnecting said unsprung portion and said vehicle body, said shock absorber including a tube; and
    a control system for positioning said vehicle body at a specified height from said unsprung portion when said position of said vehicle body is lower than a first specified amount and when said position of said vehicle body is higher than a second specified amount, said control system changing a pressure of said pressurized gas in said spring based on a difference between said position of said vehicle body and said specified height to position said vehicle body at said specified height;
    a single valve assembly attached directly to the tube of said shock absorber, said single valve assembly always being in direct communication with said pressurized gas in said spring and said control system, damping characteristics of said shock absorber at said specified height being based upon the pressure of said pressurized gas in said spring controlled by said control system.

2. The suspension damping system according to claim 1, wherein said shock absorber defines a working chamber and a reserve chamber, said valve assembly being operable to control fluid flow between said chambers.

3. The suspension damping system according to claim 2, wherein said valve assembly defines a fluid passage between said working chamber and said reserve chamber.

4. The suspension damping system according to claim 3, wherein said valve assembly comprises a valve having an open position and a closed position, fluid flow being allowed through said fluid passage when said valve is in said open position, fluid flow being prohibited through said fluid passage when said valve is in said closed position.

5. The suspension damping system according to claim 4, wherein said valve is moved between said open and closed positions by said pressurized gas at said specified pressure.

6. The suspension damping system according to claim 5, wherein said valve assembly is integral with said shock absorber.

7. The suspension damping system according to claim 4, wherein said pressurized gas at said specified pressure urges said valve into said closed position.

8. The suspension damping system according to claim 1, wherein fluid pressure of working fluid within said working chamber urges said valve into said open position.

9. The suspension damping system according to claim 1, wherein said valve assembly is integral with said shock absorber.

10. The suspension damping system according to claim 1, wherein said shock absorber defines a working chamber and a reserve chamber, said valve assembly being movable between an open position where said working chamber communicates with said reserve chamber through said valve assembly, and a closed position where communication between said working chamber and said reserve chamber through said valve assembly is prohibited.

11. The suspension damping system according to claim 10, wherein said valve assembly is moved between said open and closed positions by said pressurized gas at said specified pressure.

12. The suspension damping system according to claim 11, wherein said valve assembly is integral with said shock absorber.

13. The suspension damping system according to claim 10, wherein said pressurized gas at said specified pressure urges said valve assembly into said closed position.

14. The suspension damping system according to claim 13, wherein fluid pressure of working fluid within said working chamber urges said valve assembly into said open position.

15. The suspension damping system according to claim 1, wherein said shock absorber defines a working chamber and a reserve chamber, said valve assembly comprising:
 a housing defining a fluid pressure chamber in communication with said pressurized gas at said specified pressure;
 a first passage in communication with said working chamber;
 a second passage in communication with said reserve chamber;
 a valve disposed between said first and second passages; and
 a control member disposed between said fluid pressure chamber and said valve, said control member responsive to said pressurized gas at said specified pressure to urge said valve into a closed position where fluid flow between said first and second passages is prohibited.

16. The suspension damping system according to claim 15, wherein fluid pressure of working fluid within said working chamber urges said valve into an open position where fluid flow between said first and second passages is permitted.

17. The suspension damping system according to claim 1, wherein a pressure of said fluid supplied to said single valve assembly is always equal to the pressure of said fluid in said spring.

18. A suspension damping system for use with a vehicle having a vehicle body and an unsprung portion, said damping system comprising:
 a plurality of springs interconnecting the unsprung portion and said vehicle body, each of said plurality of springs having a pressurized gas therein;
 means for determining a position at each of said plurality of springs of said vehicle body in relation to said unsprung portion;
 a plurality of shock absorbers separate from said plurality of springs, said plurality of shock absorbers interconnecting said unsprung portion and said vehicle body, each of said plurality of shock absorbers including a tube and being associated with a respective spring of said plurality of springs; and
 a control system for positioning said vehicle body at each of said plurality of springs at a specified height from said unsprung portion when said position of said vehicle body is lower than a first specified amount and when said position of said vehicle body is higher than a second specified amount, said control system changing a pressure of said pressurized gas in each of said plurality of springs individually based on a difference between said position of said vehicle body at each of said plurality of springs and a respective specified height to position said vehicle body at each of said plurality of springs at said specified height;
 a single valve assembly attached directly to the tube of each of said plurality of shock absorbers, each of said single valve assemblies always being in direct communication with said pressurized gas in a respective spring and said control system, damping characteristics of each of said plurality of shock absorbers at said specified height being based upon the pressure of said pressurized gas in the respective spring controlled by said control system.

19. The suspension damping system according to claim 18, wherein a pressure of said fluid supplied to said single valve assembly is always equal to the pressure of said fluid in said spring.

* * * * *